Figure 1:
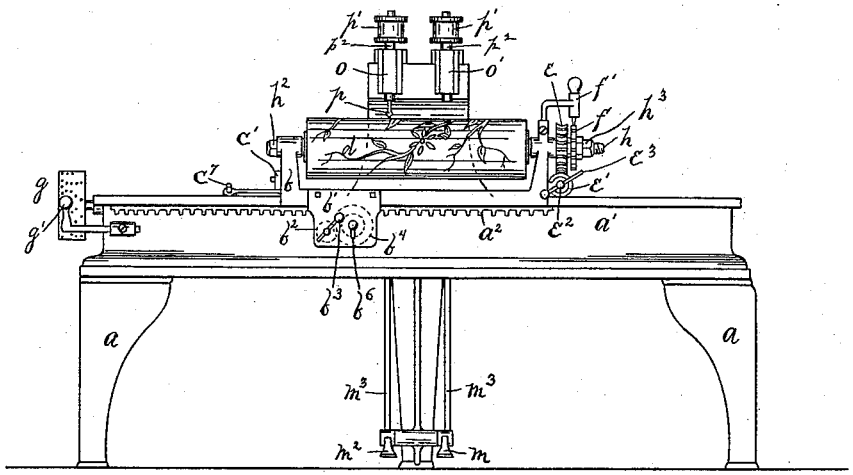

(No Model.) 4 Sheets—Sheet 1.

G. K. BIRGE, G. W. SHAMP & C. F. W. LEHMANN.
ROUTING MACHINE.

No. 376,134. Patented Jan. 10, 1888.

Witnesses:
Otto Hoddick.
Albert E. Schaaf.

Inventors,
George K. Birge
George W. Shamp
Carl Fredrick W. Lehmann
By
W. F. Mill
Attorney.

(No Model.) 4 Sheets—Sheet 2.

G. K. BIRGE, G. W. SHAMP & C. F. W. LEHMANN.
ROUTING MACHINE.

No. 376,134. Patented Jan. 10, 1888.

Witnesses:
Otto Hoddick.
Zebart E. Scharf.

Inventors,
George K. Birge.
George W. Shamp.
Carl Fredrick Wm Lehmann
By W. T. Miller
Attorneys.

(No Model.) 4 Sheets—Sheet 3.
G. K. BIRGE. G. W. SHAMP & C. F. W. LEHMANN.
ROUTING MACHINE.
No. 376,134. Patented Jan. 10, 1888.
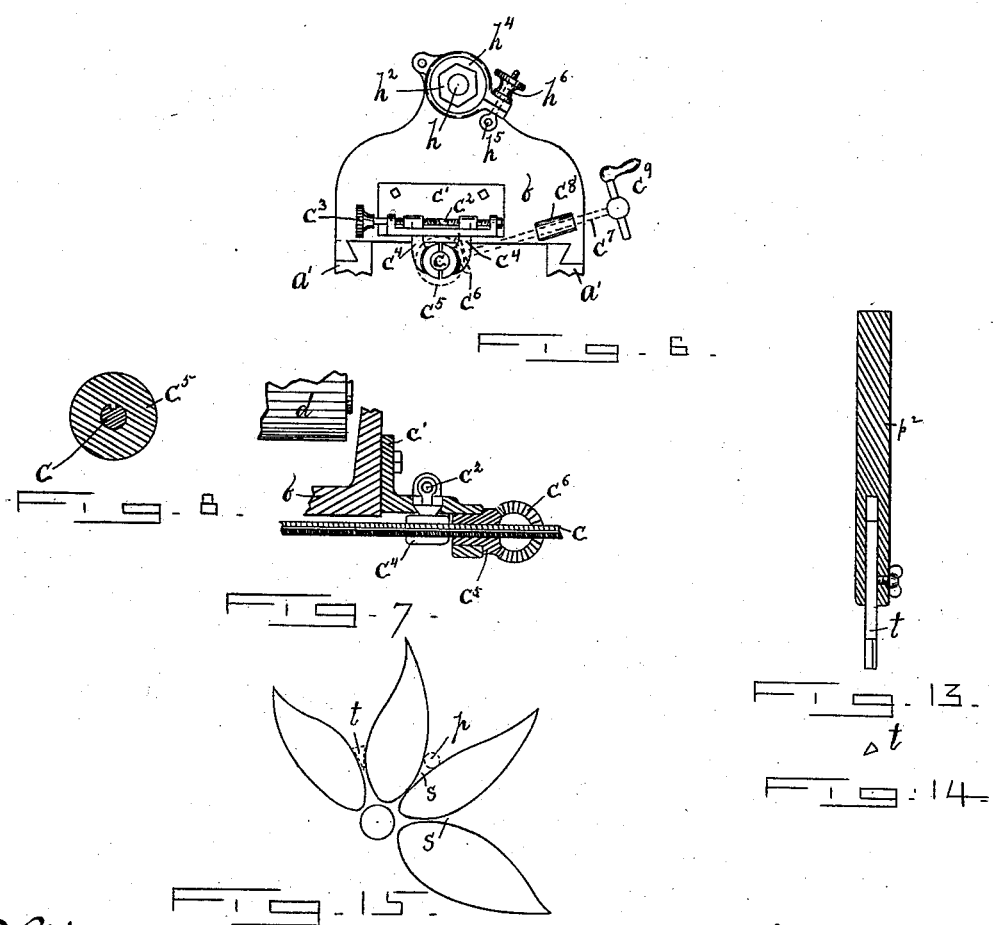

(No Model.) 4 Sheets—Sheet 4.

G. K. BIRGE, G. W. SHAMP & C. F. W. LEHMANN.
ROUTING MACHINE.

No. 376,134. Patented Jan. 10, 1888.

Witnesses:
Otto Hoddick
Albert E. Schaaf

Inventors,
George K. Birge
George W. Shamp
Carl Fredrick Wm Lehmann
By W. F. Miller
Attorney.

UNITED STATES PATENT OFFICE.

GEORGE K. BIRGE AND GEORGE W. SHAMP, OF BUFFALO, AND CARL FREDRICK WM. LEHMANN, OF NEW YORK, N. Y.; SAID SHAMP AND LEHMANN ASSIGNORS TO SAID BIRGE.

ROUTING-MACHINE.

SPECIFICATION forming part of Letters Patent No. 376,134, dated January 10, 1888.

Application filed May 31, 1887. Serial No. 239,788. (No model.)

*To all whom it may concern:*

Be it known that we, GEORGE K. BIRGE and GEORGE W. SHAMP, residing at Buffalo, in the county of Erie and State of New York, and CARL FREDRICK WILLIAM LEHMANN, residing at New York, in the county of New York and State of New York, citizens of the United States, have invented certain new and useful Improvements in Routing-Machines; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to certain improvements in the routing-machine for cutting patterns upon print-rollers for wall-paper, &c., for which Letters Patent No. 360,081 were granted on the 29th of March, 1887, to George K. Birge, such machine consisting, broadly, of a carriage adapted to receive the print-roller to be operated upon, mechanism controlled by hand to give a motion in the direction of the length of the print-roller to the carriage and a rotary motion to the roller in both directions, and a revolving drill or routing-tool adjustable to and from the roller.

The improvements which we have added to such machine consist, first, in two heads, each of which is adapted to carry a separate routing tool or stamp or saw, whereby the operation of the routing tools and stamps upon the roller to be cut is greatly facilitated; second, gages for regulating the distance between the cuts of the saw or tool; third, improved means of adjusting the roller in position upon the carriage and removing same when finished, and, fourth, other details of construction, all of which will be fully hereinafter set forth and claimed.

Figure 2:
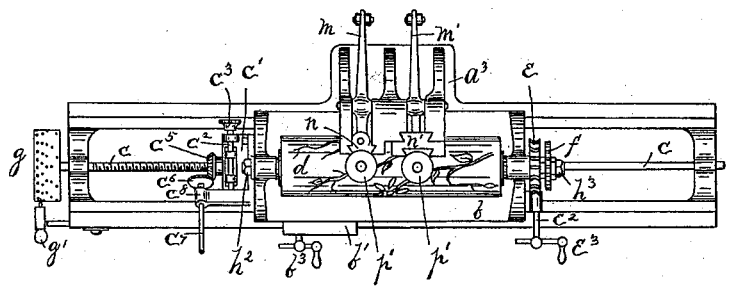
Figure 3:
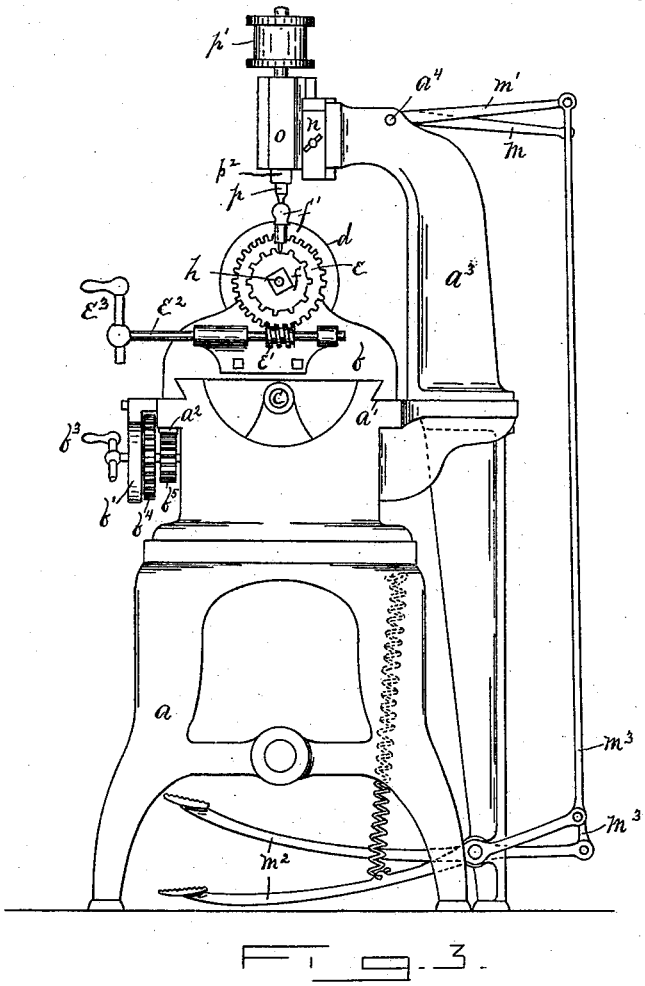
Figure 4:
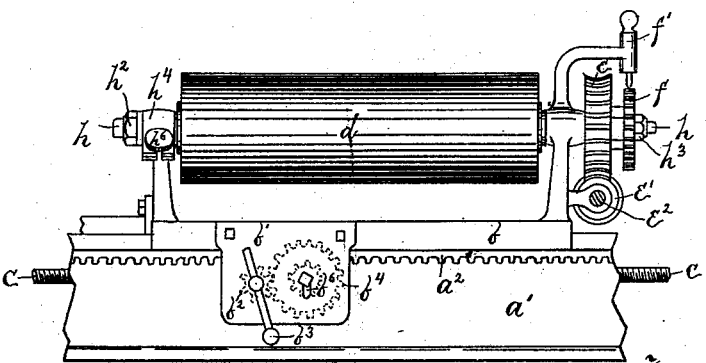
Figure 9:
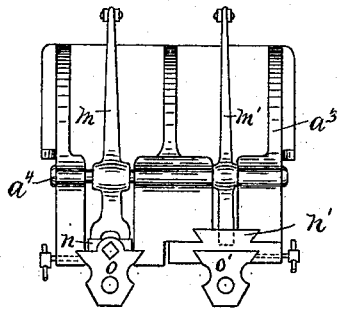
Figure 10:
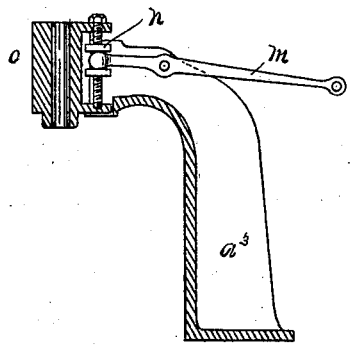
Figure 11:
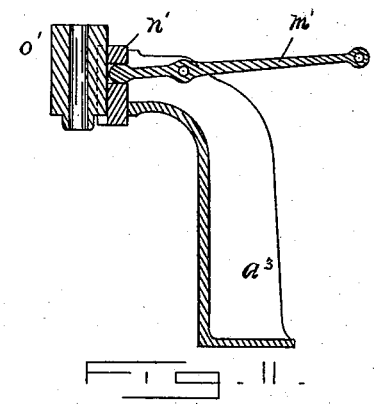
Figure 16:
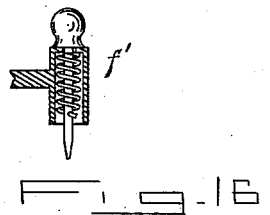

In the drawings, Figure 1 is a front elevation of our improved routing-machine. Fig. 2 is a top plan view, and Fig. 3 is a side elevation, of the same. Fig. 4 is a fragmentary portion of machine, showing means for operating the carriage and roller. Fig. 5 is a sectional view showing improved manner of attaching the roller to its mandrel and the mandrel to the carriage. Figs. 6, 7, and 8 are detached detail views of the screw-movement of the carriage. Figs. 9, 10, 11, and 12 are detached detail views of those portions of the machine carrying the routing tools, stamps, or saws. Figs. 13 and 14 show the stamp and its holder. Fig. 15 illustrates use of stamp, and Fig. 16 shows detached portion of the gages.

Referring to the drawings, $a\ a$ are the standards, upon which the bed-plate $a'$ is mounted. Upon this bed-plate $a$ is dovetailed, so as to be moved back and forth thereon, the carriage $b$, which carries the roller to be operated upon. Upon the front side of the bed-plate is horizontally arranged the rack $a^2$.

$b'$ is an overhanging bracket which carries the small spur-wheel $b^2$, actuated by the lever-handle $b^3$. The spur-wheel $b^2$ intermeshes with the larger spur-wheel, $b^4$, mounted upon the same shaft as the pinion or ratchet wheel $b^5$, which engages with the rack $a^2$ upon the bed-plate $a'$. In this manner, by turning the lever-handle $b^3$, the carriage $b$ is caused to move in either direction upon the bed-plate at the will of the operator. The shaft upon which the wheels $b^4$ and $b^5$ are mounted is adjustable up and down by means of the slot $b^6$ in the bracket $b'$, by means of which construction the ratchet-wheel $b^5$ can be thrown in and out of engagement with the rack $a^2$, as desired. This rack-and-pinion movement just described is intended for moving the carriage when a roller of wood or other material of a like degree of hardness is to be operated upon. When a metal roller, however, is to be cut, where greater accuracy and reliability of motion is required, we have provided a screw-movement arranged and operating as follows:

$c$ is a screw-threaded rod extending entirely or partially across the machine, passing under the carriage, and adapted to be revolved in its bearings. To one of the end standards of the carriage $b$ is secured the bracket $c'$, in which bracket is loosely mounted the right and left hand screw-rod $c^2$, provided with milled head $c^3$, for turning it in its bearings. Upon this screw-rod $c^2$ are mounted the two depending arms $c^4 c^4$, the lower ends of which have their inner faces semicircular and screw-threaded. (See Figs. 6 and 7.)

As the screw-threaded rod $c^2$ is turned in its bearings, the screw-threaded portions of the depending arms $c^4 c^4$ are thrown either in or out of engagement with the long screw-threaded rod $c$.

$c^5$ is a bevel gear-wheel keyed upon the screw-threaded rod $c$, as clearly shown in Fig. 8, so that when it is revolved it carries with it the rod $c$.

$c^6$ is another bevel gear-wheel, which intermeshes with the wheel $c^5$. The gear-wheel $c^6$ is mounted upon the rod $c^7$, which is turned in its bearing $c^8$ by the lever-handle $c^9$. To move the carriage $b$ in either direction, the arms $c^4 c^4$ are engaged with the screw-threaded rod $c$, and when such rod is turned with the gear-wheel $c^5$ by means of the lever-handle $c^9$ and intervening parts the clamped depending arms $c^4 c^4$, and with them the carriage $b$, to which they are secured, are caused to move in either direction, as desired. The roller $d$, mounted in the carriage $b$, is revolved in either direction, as follows: $e$ is a gear-wheel rigidly secured to the mandrel or axle which carries the roller. With this gear-wheel $e$ intermeshes the worm-gear $e'$ upon the shaft $e^2$, mounted in bearings secured to the end standard of the carriage $b$. A lever-handle, $e^3$, upon the shaft $e^2$ is used to turn the worm-gear $e'$, by means of which the roller $d$ may be revolved in either direction, as desired.

$f$ is a toothed wheel or gage mounted upon the roller's axle, which, acting in conjunction with the spring-pressed stop $f'$, (see Fig. 16,) enables the operator to accurately regulate the distance between the cuts of the saw or tool when regular patterns are being produced upon the roller. Gages $f$ of different numbers of teeth may be interchangeably used, as desired. The motion of the carriage in the direction of the length of the roller may be similarly regulated by the gage $g$, secured to the screw-threaded rod $c$, and its spring-pressed stop $g'$.

The roller $d$ to be cut is removably mounted in the carriage as follows, (see Fig. 5:) $h$ is the mandrel or axle, having at one end the enlarged tapering portion $h'$, adapted to fit within the tapering socket $d'$ of the roller. $k$ is a hollow bearing seated in the right-hand standard of the carriage, and to which the gear-wheel $e$ and gage $f$ are secured. Its inner end, $k'$, is tapering, adapting it to engage with the tapering socket $d^2$ of the roller $d$. Both outer ends of the mandrel $h$ are screw-threaded, upon which are secured the nuts $h^2$ and $h^3$. The left-hand end of the mandrel $h$ is locked in position by the nut $h^2$ and the hinged top $h^4$, provided with the locking-pin $h^5$ and nut $h^6$. (See Figs. 4 and 6.) When the parts are in position, as shown in Fig. 5, by turning the nut $h^3$ the mandrel $h$ is pulled toward the right, the tapering portion $h'$ of the mandrel forcing the roller $d$ with it and causing it to press against the tapering end $k'$ of the bearing $k$, thus holding it firmly in position to be operated upon by the cutting tools or saws. To remove the roller when finished, the hinged portion $h^4$ is unlocked and thrown up and the nut $h^3$ removed, when the mandrel can be drawn out, thus releasing the roller.

In the patent of George K. Birge hereinbefore mentioned one holder was employed for carrying the routing-tool movable to and from the roller to be cut. In our improved machine we employ two such holders, one of which may carry the routing or cutting tool and the other may carry at the same time either the saw or the stamp, to be hereinafter more fully explained, both of which form part of our present improvements.

In the standard $a^3$ are pivoted at $a^4$ the levers $m$ and $m'$, which are operated by the foot-lever $m^2 m^2$ through the intervening rods, $m^3 m^3$. The forward end of the lever $m$ is forked and rests loosely within an adjustable holder, $n$, secured to the tool-holder $o$, which in turn works up and down in ways in the standard. The shaft $p^2$, carrying the tool $p$, is placed within the holder $o$ and has a pulley, $p'$, at its upper end, by means of which and a driving-band the tool is rapidly revolved. The forward end of the lever $m'$ engages loosely with a block, $n'$, movable in the standard $a^3$, and $o'$ is an adjustable tool-holder secured in ways in the block $n'$.

Figure 12:
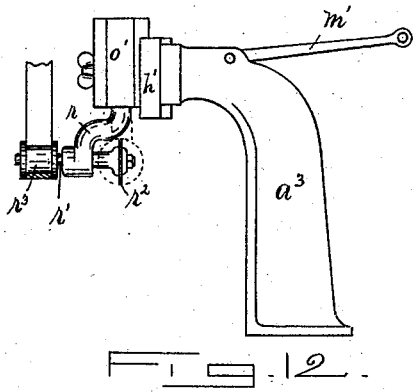

The saw and stamp before referred to are shown in Figs. 12 and 14, in which $r$ is a shank, the upper end of which is adjustable in the holder $o'$, its lower end being adapted for the reception of the shaft $r'$, which carries the circular saw $r^2$ at one end and the pulley $r^3$ at the other end, operated by a belt to revolve the saw.

By means of the adjustable shank $r$ the saw can be made to cut transversely or longitudinally of the roller. In cutting a pattern upon the roller containing a figure having sharp angles such as $s$ (shown in Fig. 15,) after the routing-tool $p$ has cut in as far as possible, the stamp $t$, (shown in Figs. 13 and 14,) having a triangular cutting-edge, is forced down, as shown in dotted lines in Fig. 15, cutting out the angle into which the routing-tool cannot reach.

The operation of our improved machine is broadly the same as that outlined in the patent to George K. Birge, except that with our improvement better and more accurate work can be done, and while that machine was confined in its operations to cutting rollers of wood or other analogous material our improved construction enables us to operate upon metal as well.

Our improved double head for carrying the tool is productive of great efficiency of operation, as with them, first, two different-sized routing-tools or two different-sized saws can be ready for instant operation interchangeably; second, two routing tools or two saws of the same size can be used, and by shifting from one to the other excessive heating by friction can be avoided; third, a routing-tool or stamp or a saw can be together mounted in the heads at the same time, and, fourth, in case of operation upon a metal roller a drill and a milling-tool can be mounted together.

The operation, in brief, of our improved machine is as follows: The roller $d$, either of wood or metal, with the pattern to be cut traced thereon, is mounted in the carriage, and by means of the different movements, hereinbefore fully outlined, the roller can be moved in the direction of its length or revolved in either direction, so as to present the proper point upon the surface of the roller to the operation of one of the drills or saws or other rapidly-revolving tool, which is thrown down in cutting-contact by means of one of the foot-levers and thrown out of cutting-contact by spiral springs connected to the foot-levers.

We claim—

1. A routing-machine for cutting patterns upon print-rollers, consisting of a carriage adapted to receive the print-roller to be operated upon, mechanism controlled by hand to give a motion in the direction of the length of the print-roller to the carriage and a rotary motion to the roller in both directions, and a double head adapted for the reception of two separate and independent revolving drills or other tools, each independently adjustable to and from the roller, all combined and operating substantially as shown and described.

2. A routing-machine for cutting patterns upon print-rollers, consisting of a carriage adapted to receive the print-roller to be operated upon, mechanism controlled by hand to give a motion in the direction of the length of the print-roller to the carriage and a rotary motion to the roller in both directions, and a gage combined with the mechanism for giving to the carriage a motion in the direction of the print-roller for the purpose of regulating the distance between the cuts of the tools in producing regular patterns, and one or more revolving tools adjustable to and from the roller, all combined and operating substantially as shown and described.

3. A routing-machine for cutting patterns upon print-rollers, consisting of a carriage adapted to receive the print-roller to be operated upon, mechanism controlled by hand to give a motion in the direction of the length of the print-roller to the carriage and a rotary motion to the roller in both directions, and a gage combined with the mechanism for giving to the roller a rotary motion in both directions for the purpose of regulating the distance between the cuts of the tools in producing regular patterns, and one or more revolving tools adjustable to and from the roller, all combined and operating substantially as shown and described.

4. A routing-machine for cutting patterns upon print-rollers, consisting of a carriage adapted to receive the print-roller to be operated upon, mechanism controlled by hand to give a motion in the direction of the length of the print-roller to the carriage and a rotary motion to the roller in both directions, and separate gages combined with each of the mechanisms for giving motions to the carriage and print-roller for the purpose of regulating the distance between the cuts of the tools in producing regular patterns, and one or more revolving tools adjustable to and from the roller, all combined and operating substantially as shown and described.

5. In a routing-machine, as a means of moving the carriage in the direction of the length of the print-roller, the screw-threaded rod $c$, secured in the frame-work, the depending arms $c^4$ $c^4$, adapted for removable screw-threaded engagement with the rod $c$ at their lower ends, their upper ends being adjustable upon the right and left hand screw-threaded rod $c^2$, secured to the carriage $b$, the bevel gear-wheel $c^5$, keyed to the rod $c$, and the bevel gear-wheel $c^6$, mounted upon the shaft $c^7$, with lever-handle $c^8$, all combined and operating substantially as shown and described.

6. In a routing-machine for cutting patterns upon print-rollers, the combination, with the roller $d$, having the tapering sockets $d'$ and $d^2$, and the mandrel $h$, with tapering portion $h'$, of the hollow bearing $k$, with tapering portion $k'$, tightening-nut $h^3$, and hinged top $h^4$, and the standard by means of which the roller is adjusted in or removed from its position in the routing-machine, substantially as shown and described.

In testimony whereof we have signed our names to this specification in the presence of subscribing witnesses.

GEORGE K. BIRGE.
  GEORGE W. SHAMP.
  CARL FREDRICK WM. LEHMANN.

Witnesses as to George K. Birge:
 HENRY M. BIRGE,
 W. T. MILLER.
Witnesses as to Geo. W. Shamp:
 OTTO HODDICK,
 W. T. MILLER.
Witnesses as to Carl Fredrick Wm. Lehmann:
 JOHN H. HILL,
 CHAS. E. HITCHCOCK.